US008784761B2

(12) United States Patent
Dube et al.

(10) Patent No.: US 8,784,761 B2
(45) Date of Patent: Jul. 22, 2014

(54) SINGLE ABSORBER VESSEL TO CAPTURE $CO_2$ (75) Inventors: Sanjay K. Dube, Knoxville, TN (US); Rameshawar S. Hiwale, Knoxville, TN (US); Peter U. Koss, Zollikon (CH); David J. Muraskin, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 356 days.

(21) Appl. No.: 12/622,653

(22) Filed: Nov. 20, 2009

(65) Prior Publication Data
US 2011/0120308 A1    May 26, 2011

(51) Int. Cl.
B01D 53/62 (2006.01)
B01D 53/78 (2006.01)
B01D 53/96 (2006.01)
B01D 53/14 (2006.01)

(52) U.S. Cl.
CPC ...... B01D 53/1475 (2013.01); *B01D 2257/504* (2013.01); *B01D 2252/102* (2013.01); B01D 53/1425 (2013.01); B01D 53/62 (2013.01); *B01D 2258/0291* (2013.01); *Y02C 10/04* (2013.01); B01D 53/1406 (2013.01); *Y02C 10/06* (2013.01)
USPC .......................................... 423/234; 423/220

(58) Field of Classification Search
USPC ........................................ 423/210, 220, 234
See application file for complete search history.

(56) References Cited

U.S. PATENT DOCUMENTS 2,106,734 A    2/1935    Gollmar
2,043,109 A    6/1936    McKee et al.
(Continued)

FOREIGN PATENT DOCUMENTS

AU    648129    7/1992
AU    678622    6/1995
(Continued)

OTHER PUBLICATIONS

PCT International Search Report and the Written Opinion of the International Searching Authority, dated Nov. 19, 2010—(PCT/US2010/047421).
(Continued)

*Primary Examiner* — Stanley Silverman
*Assistant Examiner* — Daniel Berns
(74) *Attorney, Agent, or Firm* — Cynthia W. Flanigan (57) ABSTRACT

A system for removing carbon dioxide from a flue gas stream is provided, the system comprising an absorber vessel configured to receive a flue gas stream, the absorber vessel comprising a first absorption stage configured to receive the flue gas stream and contact it with a first ionic solution, a second absorption stage configured to receive flue gas which has passed the first absorption stage and contact it with a second ionic solution, a first sump vessel, and a second sump vessel. Furthermore, a method for removing $CO_2$ from a flue gas stream containing $CO_2$ is provided, the method comprising the steps of a) contacting a flow of a first ionic solution comprising $NH_3$ with a flue gas stream to remove a first portion of $CO_2$ from the flue gas stream, b) collecting the used ionic solution from step a) in a first sump vessel, c) recycling ionic solution from the first sump vessel to step a), d) contacting a flow of a second ionic solution comprising $NH_3$ with the flue gas stream to remove a second portion of $CO_2$ from the flue gas stream, e) collecting the used ionic solution from step d) in a second sump vessel, and f) recycling ionic solution from the second sump vessel to step d).

21 Claims, 1 Drawing Sheet

(56) References Cited

U.S. PATENT DOCUMENTS

| | | |
|---|---|---|
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,947,258 A | 3/1976 | Decker |
| 4,515,760 A | 5/1985 | Lang et al. |
| 4,847,057 A | 7/1989 | Brugerolle et al. |
| 4,853,012 A | 8/1989 | Batteux et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletic |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 | 8/2007 | Yeh et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0159937 A1 | 7/2008 | Ouimet |
| 2009/0101012 A1 | 4/2009 | Gal et al. |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 1176297 | 3/1998 |
| CN | 1772345 | 5/2006 |
| CN | 1833756 | 9/2006 |
| CN | 101318651 | 12/2008 |
| CN | 101497452 | 8/2009 |
| CN | 101500691 | 8/2009 |
| DE | 2832493 | 7/1978 |
| DE | 3633690 | 4/1988 |
| DE | 199 09 923 | 3/2000 |
| DE | 199 29 408 | 1/2001 |
| EP | 0243778 | 11/1987 |
| EP | 0502596 | 9/1992 |
| EP | 0588178 | 3/1994 |
| EP | 1759756 | 3/2007 |
| FR | 2108958 | 5/1972 |
| GB | 271852 | 5/1926 |
| GB | 871207 | 6/1961 |
| GB | 899611 | 6/1962 |
| GB | 2331526 | 5/1999 |
| JP | 49-28574 | 3/1974 |
| JP | 54-19477 | 2/1979 |
| JP | 55-79026 | 6/1980 |
| JP | 57-68118 | 4/1982 |
| SU | 512785 | 5/1976 |
| SU | 1567251 | 5/1990 |
| WO | 98/47604 | 10/1998 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2008/072979 | 6/2008 |
| WO | 2008/094777 | 8/2008 |

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

First Office Action from the Chinese Patent Office issued Oct. 29, 2013 for CN application 201080051669.3.

First Office Action from the Chinese Patent Office issued Nov. 20, 2013 for CN application 201080051666.X.

First Office Action from the Chinese Patent Office issued Nov. 29, 2013 for CN application 201080051660.2.

SINGLE ABSORBER VESSEL TO CAPTURE CO₂

FIELD OF THE INVENTION

The present invention relates to a system and method for removing carbon dioxide from a flue gas stream using a multi-stage absorber vessel.

BACKGROUND

In the combustion of a fuel, such as coal, oil, peat, waste, etc., in a combustion plant, such as a power plant, a hot process gas is generated, often referred to as a flue gas, containing, among other components, carbon dioxide, $CO_2$. The negative environmental effects of releasing carbon dioxide to the atmosphere have been widely recognized, and have resulted in the development of systems and processes adapted for removing carbon dioxide from the hot process gas generated in the combustion of the above mentioned fuels.

One system and process previously disclosed is a single-stage Chilled Ammonia based system and method for removal of carbon dioxide ($CO_2$) from a post-combustion flue gas stream. Such a system and process has been proposed and taught in published US Patent Application 2008/0072762 entitled Ultra Cleaning of Combustion Gas Including the Removal of $CO_2$.

In a chilled ammonia based system/method for $CO_2$ removal, an absorber vessel is provided in which an ionic solution is contacted in counter current flow with a flue gas stream containing $CO_2$. The ionic solution may be composed of, for example, water and ammonium ions, bicarbonate ions, carbonate ions, and/or carbamate ions.

The absorber vessel is configured to receive a flue gas stream (FG) originating from, for example, the combustion chamber of a fossil fuel fired boiler. It is also configured to receive a $CO_2$ lean ionic solution supply from a regeneration system. The lean ionic solution is introduced into the vessel via a liquid distribution system while the flue gas stream FG is also received by the absorber vessel via a flue gas inlet.

The ionic solution is put into contact with the flue gas stream via a gas-liquid contacting device (hereinafter, mass transfer device, MTD) used for mass transfer and located in the absorber vessel and within the path that the flue gas stream travels from its entrance via an inlet at a bottom portion of the absorber vessel to its exit at a top portion of the absorber vessel. The MTD may be, for example, one or more commonly known structured or random packing materials, or a combination thereof.

The ionic solution is introduced at the top of the MTD and falls downward through the MTD coming into contact with the flue gas stream FG that is rising upward (opposite the direction of the ionic solution) and through the MTD.

Once contacted with the flue gas stream, the ionic solution acts to absorb $CO_2$ from the flue gas stream, thus making the ionic solution "rich" with $CO_2$ (rich solution). The rich ionic solution continues to flow downward through the mass transfer device and is then collected in the bottom of the absorber vessel. The rich ionic solution is then regenerated via a regenerator system to release the $CO_2$ absorbed by the ionic solution from the flue gas stream. The $CO_2$ released from the ionic solution may then be output to storage or other predetermined uses/purposes. Once the $CO_2$ is released from the ionic solution, the ionic solution is said to be "lean". The lean ionic solution is then again ready to absorb $CO_2$ from a flue gas stream and may be directed back to the liquid distribution system whereby it is again introduced into the absorber vessel.

Published US Patent Application 2009/0101012 describes a multi-stage $CO_2$ removal system comprising an absorber vessel in which $CO_2$ is removed from flue gas by absorption with an ionic solution, such as an ammonia solution, in different absorption stages operating at different temperatures and different $NH_3$-to-$CO_2$ ratios in the ionic solution. The multi-stage absorber vessel comprises a single sump in which $CO_2$ rich ionic solution is collected for transport to a regenerator.

A potential drawback associated with the $NH_3$ based absorption systems and processes of the prior art is that solids, such as ammonium carbonate and/or bicarbonate, formed by chemical reactions between $NH_3$ and $CO_2$, may cause plugging of the absorption column, resulting in a deterioration of the overall performance of the system.

SUMMARY OF THE INVENTION

Embodiments of the present invention provide a system and method for capturing carbon dioxide ($CO_2$) from a process gas stream.

It is an object of the embodiments of the present invention to provide a multi-stage absorber vessel which facilitates recycling of ionic solution.

It is another object of the embodiments of the present invention to provide multi-stage absorber vessel which reduces problems associated with plugging and deposition of solids formed within the absorber vessel.

In a first aspect of the present invention, the above mentioned objects, as well as further objects, which will become apparent to the skilled person when presented with the present disclosure, are achieved by the provision of a system for removing carbon dioxide from a flue gas stream (also referred to herein as "$CO_2$ capture system"), the system comprising:

an absorber vessel configured to receive a flue gas stream, said absorber vessel comprising
a first absorption stage configured to receive the flue gas stream and contact it with a first ionic solution,
a second absorption stage configured to receive flue gas which has passed the first absorption stage and contact it with a second ionic solution,
a first sump vessel, and a
second sump vessel,
wherein said first absorption stage comprises a liquid collection receptacle arranged to collect ionic solution from the first absorption stage and deliver it to the first sump vessel, and said second absorption stage comprises a liquid collection receptacle arranged to collect ionic solution from the second absorption stage and deliver it to the second sump vessel.

A multi-stage absorber vessel, in which a number of different absorption stages operate under different conditions, may often constitute a superior alternative to multiple single-stage absorber vessels arranged in series. Advantages of the multi-stage absorber vessel include, e.g., lower capital costs for vessels, packing and foundations.

The present invention is based on the inventive insight that the efficiency and versatility of a multi-stage absorber vessel may be significantly improved by division of the sump of the absorber vessel into two or more separate sections, referred to herein as sump vessels. Each of the sump vessels is arranged to receive used ionic solution from one or more predetermined absorption stages. The use of multiple sump vessels facilitates recycling of used ionic solution within the absorber vessel since ionic solution from one or more absorption stages having similar composition and properties may be collected in a first sump vessel, while ionic solution from one or more other absorption stages having similar composition and properties, different to the composition and properties of the ionic solution collected in the first sump vessel, may be collected in a second sump vessel. The ionic solution collected in the first and second sump vessels may be recycled, possibly after adjustment of the composition and properties of the respective ionic solution to a desired absorption stage. Thus, the use of multiple sump vessels allows the operating conditions, such as for example temperature, ionic solution composition and flow rate, of each absorption stage to be varied within a wide range. For example, one or more absorption stages may be operated under conditions resulting in the precipitation of solids, while one or more absorption stages are operated under conditions not resulting in precipitation of solids.

The absorber vessel comprises at least a first and a second absorption stage configured for absorption of $CO_2$ from a flue gas stream by bringing the flue gas stream into contact with an ionic solution flow under conditions allowing absorption of $CO_2$ in the ionic solution. Each absorption stage comprises at least one gas-liquid contact mass transfer device, also referred to herein as "mass transfer device" or "MTD".

Each of the first and second absorption stages further comprise a liquid collection receptacle for collecting ionic solution which has been used in the respective absorption stage. The first absorption stage comprises a liquid collection receptacle arranged to collect ionic solution from the first absorption stage and deliver it to a first sump vessel, and the second absorption stage comprises a liquid collection receptacle arranged to collect ionic solution from the second absorption stage and deliver it to the second sump vessel. The liquid collection receptacles of each of the first and second absorption stages may be configured to collect all or a portion of the used ionic solution from the respective absorption stage. The liquid collection receptacles may for example comprise a sloped collection tray or bubble cap tray.

The first absorption stage preferably comprises a liquid distribution device and an ionic solution delivery path configured for delivering ionic solution from the first sump vessel to the liquid distribution device.

The second absorption stage preferably comprises a liquid distribution device and an ionic solution delivery path configured for delivering ionic solution from the second sump vessel to the liquid distribution device.

The sump vessels may be provided in the form discrete vessels separated from the absorber vessel, or in the form of vessels integrated in the absorber vessel, or a combination thereof. Each sump vessel may be in liquid contact with one or more of the absorption stages of the absorber vessel, such that used ionic solution may be collected from each absorption stage and directed to the sump vessel, and such that ionic solution from the sump vessel may be recycled to one or more of the absorption stages. One or more of the sump vessels may preferably be formed by a bottom section of the absorber vessel. In an embodiment, the absorber vessel comprises a bottom section, in which a first and a second sump vessel is formed by two sub-sections of the bottom section.

The effectiveness of the $CO_2$ capture system in removing $CO_2$ from a flue gas stream rests largely on: 1) the temperature (T) of the ionic solution sprayed into the absorber vessel, and 2) the mole ratio (R) of ammonia contained in the ionic solution to the $CO_2$ contained in the ionic solution.

Generally, the lower the temperature and the lower the R value, the less effective an ammonia based $CO_2$ capture system is in removing $CO_2$ from a flue gas stream. The temperature of the ionic solution may be controlled via heating and/or refrigeration systems. The R value may be controlled, e.g., by controlling the amount of ammonia in the ionic solution.

Preferably at least one of the absorption stages of the $CO_2$ capture system may be configured to operate under conditions such that solid ammonium bicarbonate is formed. Formation of solid ammonium carbonate and bicarbonate in the ionic solution may be advantageous since it increases the $CO_2$ carrying capacity of the ionic solution. In an embodiment, the first absorption stage is configured to operate under conditions such that solid ammonium bicarbonate is formed. Examples of suitable conditions promoting formation of solid ammonium carbonate and bicarbonate include low $NH_3$-to-$CO_2$ mole ratio (R) of the ionic solution, such as an R value lower than 2.0, such as in the range of 1.2 to 2.0, for example in the range of 1.4 to 1.6.

Thus in an embodiment, the system further comprises a control system configured to maintain the $NH_3$-to-$CO_2$ mole ratio (R) of the ionic solution in the first sump vessel in a range of 1.2 to 2.0.

In order to achieve $CO_2$ removal from the flue gas down to a low residual concentration, such as less than 10% or less than 5% of the original concentration, at least one absorption stage may be configured to operate under conditions providing high $CO_2$ absorption efficiency. Examples of suitable conditions promoting high $CO_2$ absorption efficiency include high $NH_3$-to-$CO_2$ mole ratio (R) of the ionic solution, such as an R value higher than 1.8, preferably higher than 2.0, such as in the range of 2.0 to 4.0, for example in the range of 2.0 to 2.5.

In an embodiment, the system further comprises a control system configured to maintain the $NH_3$-to-$CO_2$ mole ratio (R) of the ionic solution in the second sump vessel in a range of 2.0 to 4.0, for example in the range of 2.0 to 2.5.

In an embodiment, the control system comprises a device configured to introduce $NH_3$ or a medium having an $NH_3$-to-$CO_2$ mole ratio (R) higher than the R of the ionic solution in the sump vessel into the ionic solution. As an example the R value of 2.0 may be adjusted by introduction of a medium having an R value of 2.5 or higher. The high R medium may, e.g., be provided from an ionic solution regenerator. Such a device may for example include a fluid connection to a supply tank for $NH_3$ or high R ionic solution, control valve and a pump.

The temperature is an important variable for the $CO_2$ absorption in the capture system. The temperature of the ionic solution in each absorption stage may be selected depending, e.g., on the degree of $CO_2$ removal efficiency desired, and on whether formation of solid ammonium bicarbonate is desired. The temperature may also be selected such that the ammonia slip, i.e. the amount of ammonia which is evaporated and incorporated into the flue gas stream, is maintained at an acceptable level. The temperature of the ionic solution when introduced into the absorption stages of the absorber vessel may generally be in the range of 0 to 25° C., but may also be higher or lower in some cases. As an example a temperature in the range of 5 to 20° C. allows high $CO_2$ capture efficiency with acceptable ammonia evaporation.

In an embodiment, the ionic solution delivery path of the first absorption stage comprises a heat exchange device for controlling the temperature of the ionic solution delivered to the liquid distribution device of the first absorption stage. The temperature of the ionic solution delivered to the liquid distribution device may preferably be controlled to be in the range of 5 to 20° C.

In an embodiment, the ionic solution delivery path of the second absorption stage comprises a heat exchange device for controlling the temperature of the ionic solution delivered to the liquid distribution device of the second absorption stage. The temperature of the ionic solution delivered to the liquid distribution device may preferably be controlled to be in the range of 5 to 20° C.

At low temperatures, for example, 0° C. up to 20° C., and low R values, for example, 1.2 up to 2.0 solid ammonium bicarbonate particles may precipitate from the ionic solution after it has been contacted with the flue gas stream. These solids contain very high concentrations of $CO_2$ (approximately 55% by weight) that has been removed from the flue gas stream by virtue of the ionic solution being placed in contact therewith. Thus, the precipitation of the solids is desired since they contain high concentrations of $CO_2$ and can be easily separated from the ionic solution and removed.

In an embodiment, the first absorption stage is configured for operating with an ionic solution containing solid particles.

Upon contact with the flue gas stream the ionic solution reacts with $CO_2$ that may be contained in the flue gas stream. This reaction is exothermic and as such results in the generation of heat in the absorber vessel. This heat can cause some of the ammonia contained in the ionic solution to change into a gas. The gaseous ammonia then, instead of migrating downward along with the liquid ionic solution, migrates upward through the absorber vessel, along with and as a part of the flue gas stream and, ultimately, escapes via the exit of the absorber vessel. The loss of this ammonia from the system (ammonia slip) decreases the molar concentration of ammonia in the ionic solution. As the molar concentration of ammonia decreases, so does the R value ($NH_3$-to-$CO_2$ mole ratio). This decrease in the R value corresponds to a decrease in the effectiveness of the ionic solution in capturing $CO_2$ from the flue gas stream.

In order to minimize the amount of ammonia slip, a final absorption stage of the $CO_2$ capture system may preferably be configured to operate at a low temperature (T), for example, a temperature from 0° C. up to 10° C. This may be achieved by, for example, controlling the temperature of the ionic solution introduced into the absorber vessel. The final absorption stage may also preferably be configured to operate with ionic solution from the first sump vessel having a low ammonia-to-$CO_2$ mole ratio (R), for example, from 1.2 up to 2.0. Optionally, in some embodiments, the final absorption stage may be configured to operate with low R ionic solution delivered from a device for separating solids from liquid, such as a hydrocyclone. Such an arrangement may be advantageous since the low R ionic solution delivered from a device for separating solids from liquid contains reduced solids, which may further reduce plugging and deposition of solids in the final absorption stage.

Thus, in an embodiment, the absorber vessel further comprises a third absorption stage configured to receive flue gas which has passed the first and the second absorption stages and contact it with an ionic solution.

The third absorption stage may further comprise a liquid distribution device and an ionic solution delivery path configured for delivering ionic solution from the first sump vessel to the liquid distribution device. In some embodiments, the ionic solution delivery path configured for delivering ionic solution from the first sump vessel to the liquid distribution device may further comprise a device configured to reduce the amount of solids in the ionic solution.

In an embodiment, the ionic solution delivery path of the third absorption stage comprises a heat exchange device for controlling the temperature of the ionic solution delivered to the liquid distribution device of the third absorption stage. The temperature of the ionic solution delivered to the liquid distribution device may preferably be controlled to be in the range of 10° C. or lower, such as e.g. about 5° C.

The conditions suitable for minimizing ammonia slip, i.e. low temperature and low R-value, may cause precipitation of solid ammonium bicarbonate in the absorption stage. Thus, in an embodiment, the third absorption stage may be configured for operating with an ionic solution containing solid particles.

In another aspect of the present invention, a method for removing $CO_2$ from a flue gas stream containing $CO_2$ (also referred to herein as "$CO_2$ capture method") is provided, the method comprising the steps of:

a) contacting a flow of a first ionic solution comprising $NH_3$ with a flue gas stream to remove a first portion of $CO_2$ from the flue gas stream, b) collecting the used ionic solution from step a) in a first sump vessel, c) recycling ionic solution from the first sump vessel to step a), d) contacting a flow of a second ionic solution comprising $NH_3$ with the flue gas stream to remove a second portion of $CO_2$ from the flue gas stream, e) collecting the used ionic solution from step d) in a second sump vessel, f) recycling ionic solution from the second sump vessel to step d).

The method of the second aspect may advantageously be performed in a $CO_2$ capture system as described above in respect of the first aspect of the invention.

The disclosed $CO_2$ capture method allows the operating conditions of each absorption stage to be varied within a wide range. For example, one or more absorption stages may be operated under conditions resulting in the formation of solids, while one or more absorption stages are operated under conditions not resulting in precipitation of solids. The method facilitates recycling of used ionic solution within the absorber vessel since ionic solution from one or more absorption steps having similar composition and properties may be collected in a first sump vessel, while ionic solution from one or more other absorption steps having similar composition and properties, different to the composition and properties of the ionic solution collected in the first sump vessel, may be collected in a second sump vessel. For example, ionic solution from absorption steps resulting in the formation of solid ammonium carbonate and/or bicarbonate in the ionic solution may be collected in a first sump vessel, while ionic solution from absorption steps not resulting in the formation of solid ammonium carbonate and/or bicarbonate in the ionic solution may be collected in a second sump vessel.

At low temperatures, for example, 0° C. up to 20° C., and low R values, for example, 1.2 up to 2.0 solid ammonium bicarbonate particles will precipitate from the ionic solution after it has been contacted with the flue gas stream. These solids contain very high concentrations of $CO_2$ (approximately 55% by weight) that has been removed from the flue gas stream by virtue of the ionic solution being placed in contact therewith. Thus, the precipitation of the solids is desired since they contain high concentrations of $CO_2$ and can be easily separated from the ionic solution and removed.

Thus, in an embodiment, step a) of the method is performed under conditions such that solid ammonium bicarbonate is formed.

In an embodiment, the first ionic solution has a $NH_3$-to-$CO_2$ mole ratio (R) in the range of 1.2 to 2.0.

In an embodiment, the method further comprises the step of adjusting the $NH_3$-to-$CO_2$ mole ratio (R) of the ionic solution in the first sump vessel to be in the range of 1.2 to 2.0.

In an embodiment, the adjustment of the $NH_3$-to-$CO_2$ mole ratio (R) is achieved by introducing $NH_3$ or a medium having a $NH_3$-to-$CO_2$ mole ratio (R) higher than the R of the ionic solution in the sump vessel into the ionic solution. In an embodiment, the medium may be ionic solution from the second sump vessel.

In an embodiment, step d) of the method is performed under conditions such that essentially no solid ammonium bicarbonate is formed.

In order to achieve $CO_2$ removal from the flue gas down to a low residual concentration, such as less than 10% or less than 5% of the original concentration, at least one absorption stage may be configured to operate under conditions providing high $CO_2$ absorption efficiency. Examples of suitable conditions promoting high $CO_2$ absorption efficiency include high $NH_3$-to-$CO_2$ mole ratio (R) of the ionic solution, such as an R value higher than 1.8, preferably higher than 2.0, such as in the range of 2.0 to 4.0, for example in the range of 2.0 to 2.5.

Thus, in an embodiment, the second ionic solution has a $NH_3$-to-$CO_2$ mole ratio (R) in the range of 2.0 to 4.0.

In an embodiment, the method further comprises the step of adjusting the $NH_3$-to-$CO_2$ mole ratio (R) of the ionic solution in the second sump vessel to be in the range of 2.0 to 4.0.

In an embodiment, the adjustment of the $NH_3$-to-$CO_2$ mole ratio (R) is achieved by introducing $NH_3$ or a medium having a $NH_3$-to-$CO_2$ mole ratio (R) higher than the R of the ionic solution in the sump vessel into the ionic solution.

In an embodiment, the temperature of the first ionic solution in step a) is controlled to be in the range of 5 to 20° C.

In an embodiment, the temperature of the second ionic solution in step d) is controlled to be in the range of 5 to 20° C.

In order to minimize the amount of ammonia slip, a final absorption stage of the $CO_2$ capture system may preferably be configured to operate at a low temperature (T), for example, a temperature from 0° C. up to 10° C. The final absorption stage may also preferably be configured to operate with ionic solution from the first sump vessel having a low $NH_3$-to-$CO_2$ mole ratio (R), for example, from 1.2 up to 2.0.

In an embodiment, the method further comprises the step of contacting a flow of a third ionic solution comprising $NH_3$ and having a $NH_3$-to-$CO_2$ mole ratio (R) in the range of 1.2 to 2.0 with the flue gas stream to remove a third portion of $CO_2$ from the flue gas stream. The temperature of the third ionic solution may preferably be controlled to be in the range of 10° C. or lower.

DETAILED DESCRIPTION

Figure 1:
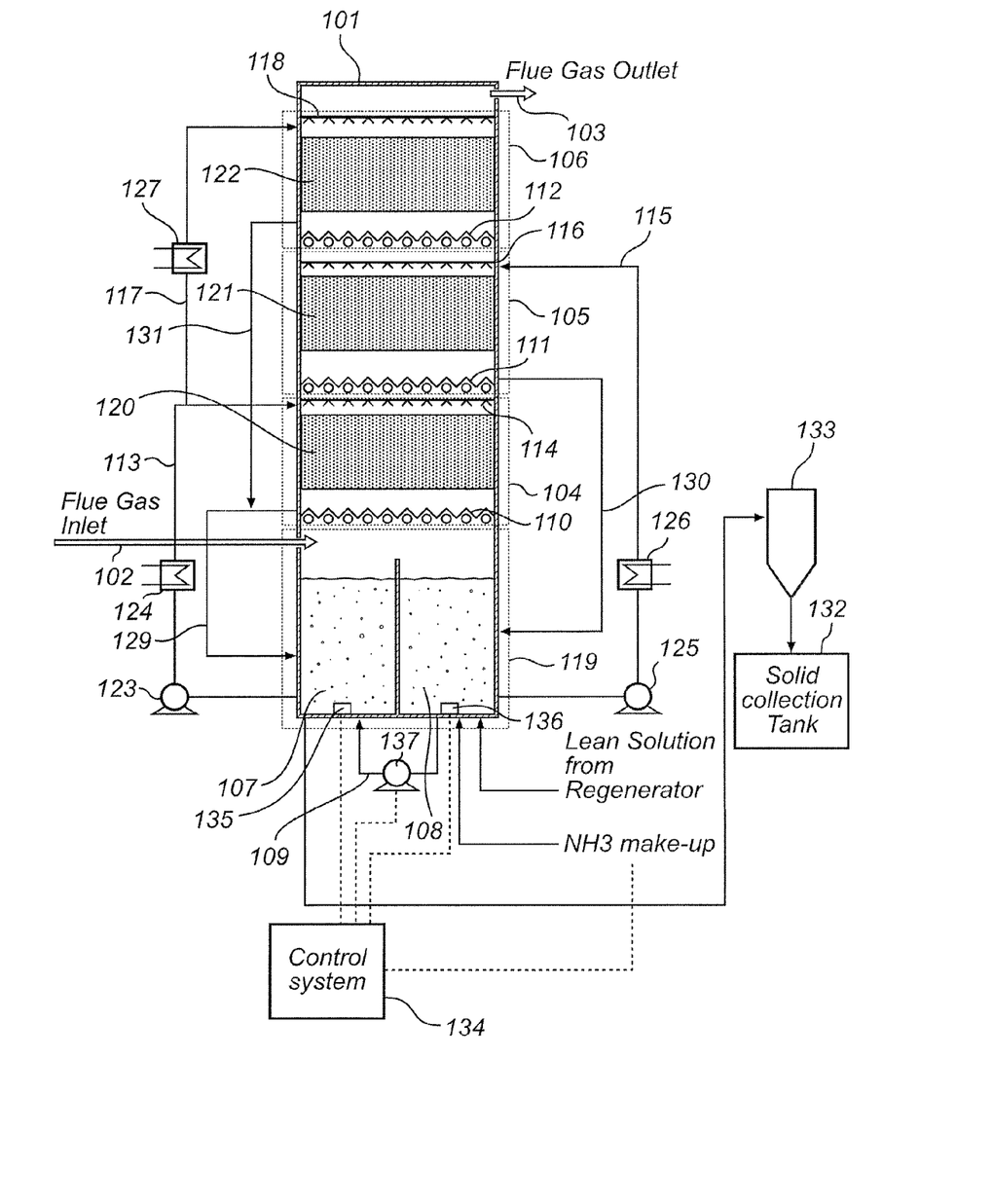
FIG. 1 is a diagram generally depicting an embodiment of a $CO_2$ capture system that includes a multi-stage absorber vessel with two sump vessels.

One embodiment of the proposed invention is generally depicted in FIG. 1. In this embodiment, a $CO_2$ capture system is provided that includes three (3) absorption stages. It is, however, possible to include more or fewer absorption stages in the capture system without departing from the scope or spirit of the present invention.

Referring to FIG. 1 a single absorber vessel 101 is provided. The absorber vessel 101 is configured to receive a flue gas stream FG via an inlet 102 located near the bottom of the vessel 101 and to allow the flue gas stream FG to pass upward and through the absorber vessel 101 to exit via an outlet 103 located near the top of the vessel 101.

The flue gas stream FG entering the absorber vessel 101 will typically contain less than one percent moisture and low concentrations of $SO_2$, $SO_3$, HCl, and particulate matter (PM) which will typically be removed via air pollution control systems (not shown) upstream from the $CO_2$ capture system. For example, the flue gas stream will typically contain less than 50 ppmv of $SO_2$; less than 5 ppmv of $SO_3$; less than 1 ppmv of HCl and/or less than 100 mg/nm$^3$ of PM.

The absorber vessel 101 is configured to absorb $CO_2$ that may be contained in a flue gas stream, using an ionic solution. In a preferred embodiment, the ionic solution may be composed of, for example, water and ammonium ions, bicarbonate ions, carbonate ions, and/or carbamate ions.

The $CO_2$ capture system comprises three absorption stages 104, 105 and 106, the first (104) and third (106) absorption stages being connected to a first sump vessel 107, and the second (105) absorption stages being connected to a second sump vessel 108 in a manner described in detail hereinbelow.

The $CO_2$ capture system comprises two separate ionic solution sump vessels 107 and 108, referred to herein as the first (107) and second (108) sump vessel. The term separate generally means that the ionic solution in the first sump vessel is not in continuous liquid contact with the ionic solution in the second sump vessel. Although the first and second sump vessels are not in continuous liquid contact, the system may further comprise a conduit 109 for transferring ionic solution from the second sump vessel 108 to the first sump vessel 107.

The first sump vessel 107 is arranged to receive used ionic solution from the first absorption stage 104 via liquid collection receptacle 110, and from the third absorption stage 106 via liquid collection receptacle 112. The second sump vessel 108 is arranged to receive used ionic solution from the second absorption stage 105 via liquid collection receptacle 111. The first sump vessel is arranged to supply ionic solution to the first absorption stage via a solution delivery path 113 and a liquid distribution device 114 and to the third absorption stage via a solution delivery path 117 and a liquid distribution device 118. The second sump vessel is arranged to supply ionic solution to the second absorption stage via a solution delivery path 115 and a liquid distribution device 116. The first and/or second sump vessels are further configured for receiving $CO_2$ lean ionic solution from a regenerator (not shown) and/or make-up $NH_3$.

In the embodiment shown in FIG. 1, the first (107) and second (108) sump vessels are formed by two sub-sections of the bottom portion 119 of the absorber vessel, below the first absorption stage.

The $CO_2$ capture system may further comprise a control system for controlling the $NH_3$-to-$CO_2$ mole ratio (R) in the first and second sump vessel to be within a desired range. The control system may comprise sensors for automated or manual measurement of relevant parameters, such as e.g. pH value, ammonia concentration and/or $CO_2$ concentration, and devices, such as liquid connections, valves and pumps, configured for adjustment of such parameters, e.g., by addition of make-up $NH_3$ and/or removal of $CO_2$. Preferably, the system may comprise an automatic controller 134, by which the $NH_3$-to-$CO_2$ mole ratio is maintained at desired values in the first and second sump vessel. For example, the automatic controller 134 may be a general-purpose computer, application specific computing device or other programmable controller that receives input signals indicative of the R value from sensors 135, 136 in the first and second sump vessels 107, 108. The automatic controller 134 may provide control signals to a pump 137, control valve, or other fluid flow adjusting device, to maintain R within the first sump vessel 107 to within the desired range, and may provide control signals to the NH3 make-up supply and/or the lean solution supply from the regenerator to maintain R within the desired range in the second sump vessel 108. In an embodiment, the R value in the first sump vessel is maintained in a range of 1.2 to 2.0 by replacing a portion of the ionic solution containing solid ammonium bicarbonate with high R ionic solution from the second sump vessel via conduit 109, and the R value in the second sump vessel is maintained in a range of 2.0 to 4.0 by replacing the portion of ionic solution sent to the first sump vessel with $CO_2$ lean ionic solution from the regenerator and/or make-up $NH_3$.

Each absorption stage (104, 105 and 106) is configured to include one or more suitable gas-liquid mass transfer devices (MTD) (120, 121 and 122), a liquid distribution device (114, 116 and 118) and a solution delivery path (SDP) (113, 115 and 117).

Each mass transfer device 120, 121 and 122 is configured to contact ionic solution with the flue gas stream FG as the flue gas flows upwards through the absorber vessel 101, counter current to the ionic solution containing, for example, a dissolved and/or suspended mix of ammonium ions, carbonate ions, ammonium bicarbonate and/or carbamate ions in which the $CO_2$ is absorbed. Mass transfer devices (MTD) 120, 121 and 122 may be, for example, structured or random packing materials.

Liquid distribution device(s) 114, 116 and 118 are configured to introduce ionic solution into the absorber vessel 101. Each liquid distribution device may be configured as, for example, one or more spray head nozzles and/or conduit with perforations, holes and/or slots or a combination thereof.

Each SDP (113, 115 and 117) is configured to deliver a flow of ionic solution (ionic solution flow) to the respective absorption stage via a liquid distribution device (114, 116 and 118 respectively). Each SDP will preferably include one or more cooling systems, such as, for example, a heat exchange device, for cooling ionic solution pumped through the SDP. A control system is also preferably provided for controlling the flow of the ionic solution and maintaining ionic solution temperature at a predetermined level or within a predetermined temperature range. The control system may include a controller, for example a general purpose computer, an application specific computing device or other programmable controller, that receives input signals from one or more temperature sensor and provides control signals to a heat exchange device to effect cooling or heating of the ionic solution. The control system may be preferably integrated with the control system described above for controlling the R-value of the ionic solution, and the controller, e.g. computing device, may preferably be the same. With reference to FIG. 1, the first absorption stage 104 includes a SDP 113 that is composed of conduit/pipe that connects the first sump vessel 107 with liquid distribution device 114 via pump 123 and heat exchanger 124. The second absorption stage 105 includes a SDP 115 that is composed of conduit/pipe that connects a second sump vessel 108 to the liquid distribution device 116 via pump 125 and heat exchanger 126. The third absorption stage 106 includes a SDP 117 that is composed of conduit/pipe that connects the first sump vessel 107, with liquid distribution device 118 via pump 123, heat exchanger 124 and heat exchanger 127.

Each absorption stage (104, 105 and 106) may comprise a device for collecting ionic solution which has passed through the respective MTD (120, 121 and 122). Each such liquid collection receptacle 110, 111 and 112 may be configured to collect all or a portion of the liquid which passes through the respective MTD. Each liquid collection receptacle may for example be configured to collect substantially all, i.e. about 95% or more, such as 98% or more of the ionic solution which passes through the respective MTD. Alternatively, a major portion of the ionic solution which passes through the respective MTD may be collected, for example more than 50%, such as more than 70% or more than 90% of the ionic solution. The liquid collection receptacles may preferably be arranged or configured such that flue gas rising up through the absorber vessel 101 may pass through or alongside the liquid collection receptacles. The liquid collection receptacles may for example comprise a sloped collection tray or bubble cap tray. The liquid collection receptacles may further comprise one or more liquid outlets configured for removal of liquid collected by the liquid collection receptacles. The liquid collection receptacle 110 of the first absorption stage is connected to the first sump vessel 107 via conduit 129 which allows used ionic solution collected by the liquid collection receptacle to be directed to the first sump vessel to be recycled. The liquid collection receptacle 111 of the second absorption stage is connected to the second sump vessel 108 via conduit 130 which allows used ionic solution collected by the liquid collection receptacle to be directed to the second sump vessel to be recycled. The liquid collection receptacle 112 of the third absorption stage is connected to the first sump vessel 107 via conduit 131 which allows used ionic solution collected by the liquid collection receptacle to be directed to the first sump vessel to be recycled.

The liquid collection receptacles may further comprise a flush system (not shown) for preventing solids accumulation and deposit formation. In some embodiments, liquid which has passed through the MTD of the first absorption stage may be collected directly in a bottom portion of the absorber vessel. In such embodiments, no further liquid collection receptacle may be required for the first absorption stage.

The first absorption stage 104 is configured to contact a low R ionic solution received from the first sump vessel 107 via SDP 113 with the flue gas stream. This ionic solution is pumped from the first sump vessel 107 via pump 123 to the liquid distribution device 114, which sprays the ionic solution downward and onto the mass transfer device 120. In this way the flue gas stream FG comes into contact with the ionic solution sprayed from liquid distribution device 114. The temperature of the ionic solution at absorption stage 104 is preferably controlled to be in a range from 5° C. to 20° C. or higher. $CO_2$ captured from the FG at absorption stage 104 forms ionic solution with precipitation of ammonium carbonate and bicarbonate. After the ionic solution has been contacted with the flue gas stream FG it is rich in $CO_2$ (rich solution). This rich in $CO_2$ solution is discharged from absorption stage 104 to the first sump vessel 107 via conduit 129. Solids collected in the first sump vessel 107 may be separated and transferred to a solid collection tank 132. A portion of the ionic solution in the first sump vessel 107 may be pumped to a regenerator system (not shown) to increase the ammonia-to-$CO_2$ mole ratio (R) of the liquid.

The MTD 120 of the first absorption stage may preferably be configured to be less sensitive to plugging by solid particles. For example, the type and size of the packing material of the MTD 120 may be selected for reduced sensitivity towards plugging and deposition of solid particles. The person skilled in the art may readily select a suitable packing material for operation with a liquid comprising particles of known size, shape and quantity.

The second absorption stage 105 is configured to operate at a high level of $CO_2$ capture efficiency. In one embodiment, the absorption stage 105 is configured to capture, for example, 50-90% of the $CO_2$ that may be contained in the flue gas stream FG. Here, high R, $CO_2$ lean ionic solution from the second sump vessel 108 is sprayed via liquid distribution device 116, onto the MTD 121. The high R, $CO_2$ lean solution sprayed via the spray system 116 is contacted with the flue gas stream FG as it flows from the first absorption stage 104 upward through the MTD 121 of the second absorption stage.

The MTD 121 of the second absorption stage may preferably be configured to provide $CO_2$ capture efficiency. The type and size of the packing material of the MTD 121 of the second absorption stage may be selected for providing a high surface contact area between the flue gas FG stream and the ionic solution. A packing material suitable for use in the MTD of the second absorption stage may readily be selected by a person skilled in the art.

The absorber vessel 101 may optionally further comprise a third absorption stage 106 for further removal of $CO_2$ from the flue gas and for reduction of ammonia slip from the previous absorption stages.

The flue gas rising upward in the absorption vessel 101 from the second absorption stage 105 contains a low concentration of $CO_2$ (for example 10% or less of the concentration in the FG inlet) and a relatively high concentration of $NH_3$ (for example from 5000 ppm up to 30000 ppm). The high concentration of ammonia in the flue gas (ammonia slip) from the second absorption stage 105 is a result of the high R of the ionic solution in the second absorption stage 105. A large portion of the ammonia that has evaporated in the second absorption stage 105 may be re-captured back into the ionic solution via a third absorption stage 106, which preferably operates at a lower R value and lower temperature.

In the third absorption stage 106, a relatively small flow of ionic solution having a low R (for example less than 2.0, such as in the range of 1.2-2.0) and low temperature (for example less than 10° C. and preferably about 5° C.) is sprayed via liquid distribution device 118 onto the MTD 122 wherein it is contacted with the flue gas stream FG as it flows upward through the MTD 122. The ionic solution discharged from the third absorption stage 106 may preferably be collected in the first sump vessel 107 via conduit 131.

The MTD 122 of the third absorption stage may preferably be configured to be less sensitive to plugging by solid particles. For example, the type and size of the packing material of the MTD 122 may be selected for reduced sensitivity towards plugging and deposition of solid particles. The person skilled in the art may readily select a suitable packing material for operation with a liquid comprising particles of known size, shape and quantity.

The absorber vessel 101 may be configured to provide for circulation of ionic solution collected at the bottom of the first sump vessel 107 to a solid collection tank 132 optionally via a hydrocyclone 133. The hydrocyclone may be used increase the solids content of the ionic solution before it is sent to the solid collection tank 132. The overflow from the hydrocyclone containing reduced quantity of solids may be sent to the third absorption stage.

Each of the absorption stages 104, 105 and 106 are configured to carry out a particular phase of the $CO_2$ absorption process. For example, stage 104 is configured to carry out phase 1 of the process whereby a portion of the $CO_2$ contained in the flue gas is captured. Stage 105 is configured to carry out phase 2 of the process whereby an additional portion of the $CO_2$ contained in the flue gas is captured. Stage 106 is configured to carry out phase 3 of the process. In phase 3 an additional portion of the $CO_2$ contained in the flue gas is captured.

In a preferred embodiment, between 40% and 90% of the $CO_2$ contained in the flue gas stream FG when it enters the inlet 102 will be removed from the flue gas stream after being subjected to phases 1-3 and before it exits the exit 103. Each phase may or may not be carried out in a predetermined sequence.

In phase 1 of the $CO_2$ absorption process a portion of the $CO_2$ contained in the flue gas stream is removed via contacting ionic solution from the first sump vessel 107 with the flue gas stream. The temperature of the ionic solution during phase 1 is controlled to be higher than the temperature of the ionic solution at phase 2 or phase 3 of the $CO_2$ absorption process. For example, at phase 1, the temperature of the ionic solution is controlled to be in the range of 5° C. to 20° C. The R value of the ionic solution in phase 1 is low, for example, 1.2 to 2.0.

During phase 1 solids of ammonium carbonate and bicarbonate containing high concentrations of $CO_2$ are allowed to precipitate from the ionic solution.

The $CO_2$ rich ionic solution, possibly comprising solids of ammonium carbonate and bicarbonate, is collected via the liquid collection receptacle and transferred to the first sump vessel 107.

The solids may subsequently be separated from the ionic solution and removed via, for example, a hydrocyclone. Once the solids are removed from the ionic solution, the ionic solution is leaner in $CO_2$ (i.e. contains less $CO_2$) and can be used to capture more $CO_2$ from a flue gas stream.

The $NH_3$-to-$CO_2$ mole ratio (R) of the ionic solution in first sump vessel is controlled to be within a range of 1.2 to 2.0 by addition of make-up $NH_3$, which may be supplied, e.g. in the form of pure $NH_3$ or an solution of $NH_3$, such as $CO_2$ lean ionic solution from the regenerator. In an embodiment, make-up $NH_3$ may be supplied in the form of the second ionic solution which has a higher R value than the first ionic solution. The $NH_3$-to-$CO_2$ mole ratio of the ionic solution in first sump vessel may further be controlled by removal of solid ammonium carbonate and bicarbonate which has accumulated in the vessel. The solid ammonium bicarbonate is high in $CO_2$, and removal thereof results in an increase of the R value of the first ionic solution.

The temperature of the ionic solution in phase 2 is preferably controlled to be in a range from 5° C. to 20° C. and the R value of the ionic solution is higher than in phase 1, for example in a range of 2.0 to 4.0 and preferably in a range of 2.0 to 2.5. The ionic solution in phase 2 is preferably provided from the second sump vessel. The ionic solution in phase 2 is highly reactive and can capture a significant portion of the $CO_2$ content of the flue gas. However, the reactive ionic solution in phase 2 has relatively high vapor pressure of ammonia which results in a relatively high ammonia concentration in the flue gas leaving phase 2 and flowing to the third stage 106 (phase 3) of the $CO_2$ absorption process.

The $CO_2$ rich second ionic solution from phase 2 is collected via the liquid collection receptacle of the second absorption stage and transferred to the second sump vessel 108.

The $NH_3$-to-$CO_2$ mole ratio (R) of the ionic solution in second sump vessel is controlled to be within a range of 2.0 to 4.0 by addition of make-up $NH_3$, which may be supplied, e.g. in the form of pure $NH_3$ or a solution of $NH_3$, such as $CO_2$ lean ionic solution from the regenerator.

During phase 3 loss of gaseous ammonia is minimized by controlling the temperature and the R value of the ionic solution so as to lower the vapor pressure of the ammonia from the ionic solution and thus to reduce the ammonia concentration in the gas phase of phase 3. By reducing ammonia vapor pressure and keeping most of the ammonia as part of the liquid ionic solution, ammonia losses from the system will be minimized. This reduction in ammonia slip helps keep the $NH_3$-to-$CO_2$ mole ratio (R) at a higher level, for example, from 1.2 to 2.0. As a result, the effectiveness of the system in removing $CO_2$ from the flue gas stream is preserved or otherwise not deteriorated. The temperature of the ionic solution at phase 3 is controlled to be, for example, in a range of from 0° C. to 10° C.

Controlling the $NH_3$-to-$CO_2$ mole ratio (R) in the first and second sump vessel to be within a desired range may be achieved by automated or manual measurement of relevant parameters, such as e.g. pH value, ammonia concentration and/or $CO_2$ concentration, and adjustment of such parameters by addition of make-up $NH_3$ and/or removal of $CO_2$. Preferably, the system may comprise an automatic controller 134, by which the $NH_3$-to-$CO_2$ mole ratio is maintained at desired values in the first and second sump vessel. In an embodiment, R in the first sump vessel is maintained in a range of 1.2 to 2.0 by replacing a portion of the ionic solution containing solid ammonium bicarbonate with high R ionic solution from the second sump vessel, and R in the second sump vessel is maintained in a range of 2.0 to 4.0 by replacing the portion of ionic solution sent to the first sump vessel with $CO_2$ lean ionic solution from the regenerator and/or make-up $NH_3$. For example, the automatic controller 134 may be a general-purpose computer, application specific computing device or other programmable controller that receives input signals indicative of the R value from sensors 135, 136 in the first and second sump vessels 107, 108. The automatic controller 134 may provide control signals to a pump 137, control valve, or other fluid flow adjusting device, to maintain R within the first sump vessel 107 to within the desired range, and may provide control signals to the $NH_3$ make-up supply and/or the lean solution supply from the regenerator to maintain R within the desired range in the second sump vessel 108.

The heat rejected from the first absorption stage 104, as well as the second absorption stage 105, occur at a relatively high temperature (up to 5° C.-20° C.). This cooling can be achieved with seawater or cooling tower water if ambient conditions allow it, hence reducing the overall demand for chilling the solution significantly. When chilled water is used, the power consumption for chilling the higher temperature ionic solution is much lower than the power required for chilling the lower temperature ionic solution.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. Method for removing $CO_2$ from a flue gas stream containing $CO_2$, the method comprising the steps of:
    arranging in a single absorber vessel
    a) in a cycle, contacting a flow of a first ionic solution comprising $NH_3$ with a flue gas stream to remove a first portion of $CO_2$ from the flue gas stream to produce a used first ionic solution,
    b) collecting the used first ionic solution in a first sump vessel to obtain the first ionic solution, said first sump vessel defined by a first division of a sump of the single absorber vessel, and
    c) recycling the first ionic solution from said first sump vessel back to flue gas stream to complete the cycle and remove another first portion of $CO_2$ from the flue gas stream, and
    d) in a cycle, contacting a flow of a second ionic solution comprising $NH_3$ with the flue gas stream to remove a second portion of $CO_2$ from the flue gas stream to produce a used second ionic solution,
    e) collecting the used second ionic solution in a second sump vessel to obtain the second ionic solution, said second sump vessel defined by a second division of a sump of the single absorber vessel, and
    f) recycling the second ionic solution from said second sump vessel back to flue gas stream to complete the cycle and remove another second portion of $CO_2$ from the flue gas stream.

2. The method according to claim 1, wherein the sump of the single absorber vessel is disposed in a lower portion of the single absorber vessel.

3. The method according to claim 1, wherein contacting the flow of the first ionic solution with the flue gas stream is performed under conditions such that solid ammonium bicarbonate is formed.

4. The method according to claim 3, wherein collecting the used second ionic solution in a second sump vessel includes adjusting the composition and properties of the used second ionic solution to obtain the second ionic solution.

5. The method according to claim 1, wherein said first ionic solution has a $NH_3$-to-$CO_2$ mole ratio (R) in the range of 1.2 to 2.0.

6. The method according to claim 1, further comprising the step of adjusting the $NH_3$-to-$CO_2$ mole ratio (R) of the ionic solution in the first sump vessel to be in the range of 1.2 to 2.0.

7. The method according to claim 6, wherein the adjustment of the $NH_3$-to-$CO_2$ mole ratio (R) is achieved by introducing $NH_3$ and/or a medium having a $NH_3$-to-$CO_2$ mole ratio (R) higher than the R of the ionic solution into the first sump vessel.

8. The method according to claim 7, wherein said medium is ionic solution from the second sump vessel.

9. The method according to claim 1, wherein contacting the flow of the second ionic solution with the flue gas stream is performed under conditions such that essentially no solid ammonium bicarbonate is formed.

10. The method according to claim 1, wherein said second ionic solution has a $NH_3$-to-$CO_2$ mole ratio (R) in the range of 2.0 to 4.0.

11. The method according to claim 1, further comprising the step of adjusting the $NH_3$-to-$CO_2$ mole ratio (R) of the ionic solution in the second sump vessel to be in the range of 2.0 to 4.0.

12. The method according to claim 11, wherein the adjustment of the $NH_3$-to-$CO_2$ mole ratio (R) is achieved by introducing $NH_3$ and/or a medium having a $NH_3$-to-$CO_2$ mole ratio (R) higher than the R of the ionic solution in the second sump vessel into the second sump vessel.

13. The method according to claim 1, wherein the temperature of the first ionic solution in step a) is controlled to be in the range of 5 to 20° C.

14. The method according to claim 1, wherein the temperature of the second ionic solution in step d) is controlled to be in the range of 5 to 20° C.

15. The method according to claim 1, further comprising the step of contacting a flow of a third ionic solution comprising $NH_3$ and having a $NH_3$-to-$CO_2$ mole ratio (R) in the range of 1.2 to 2.0 with the flue gas stream to remove a third portion of $CO_2$ from the flue gas stream.

16. The method according to claim 15, wherein said flow of a third ionic solution is delivered from the first sump vessel.

17. The method according to claim 16, wherein said flow of a third ionic solution is delivered via a device configured to reduce the amount of solids in the ionic solution.

18. The method according to claim 15, wherein the temperature of the third ionic solution is controlled to be in the range of 10° C. or lower.

19. Method for removing $CO_2$ from a flue gas stream containing $CO_2$, the method comprising the steps of:
   arranging in a single absorber vessel
   a) in a cycle, contacting a flow of a first ionic solution comprising $NH_3$ with a flue gas stream to remove a first portion of $CO_2$ from the flue gas stream to produce a used first ionic solution,
   b) collecting the used first ionic solution and receiving regenerated ionic solution in a first sump vessel to obtain first ionic solution, and
   c) recycling first ionic solution from said first sump vessel back to flue gas stream to complete the cycle and remove another first portion of $CO_2$ from the flue gas stream, and
   d) in a cycle, contacting a flow of a second ionic solution comprising $NH_3$ with the flue gas stream to remove a second portion of $CO_2$ from the flue gas stream to produce a used second ionic solution,
   e) collecting the used second ionic solution and receiving regenerated ionic solution in a second sump vessel to obtain second ionic solution, and
   f) recycling second ionic solution from said second sump vessel back to flue gas stream to complete the cycle and remove another second portion of $CO_2$ from the flue gas stream.

20. The method according to claim 19, wherein the first sump vessel is defined by a first division of a sump of the single absorber vessel; and the second sump vessel is defined by a second division of a sump of the single absorber vessel.

21. The method according to claim 19, wherein collecting the used first ionic solution in a first sump vessel includes adjusting the composition and properties of the used first ionic solution to obtain the first ionic solution.

* * * * *